Patented Mar. 23, 1926.

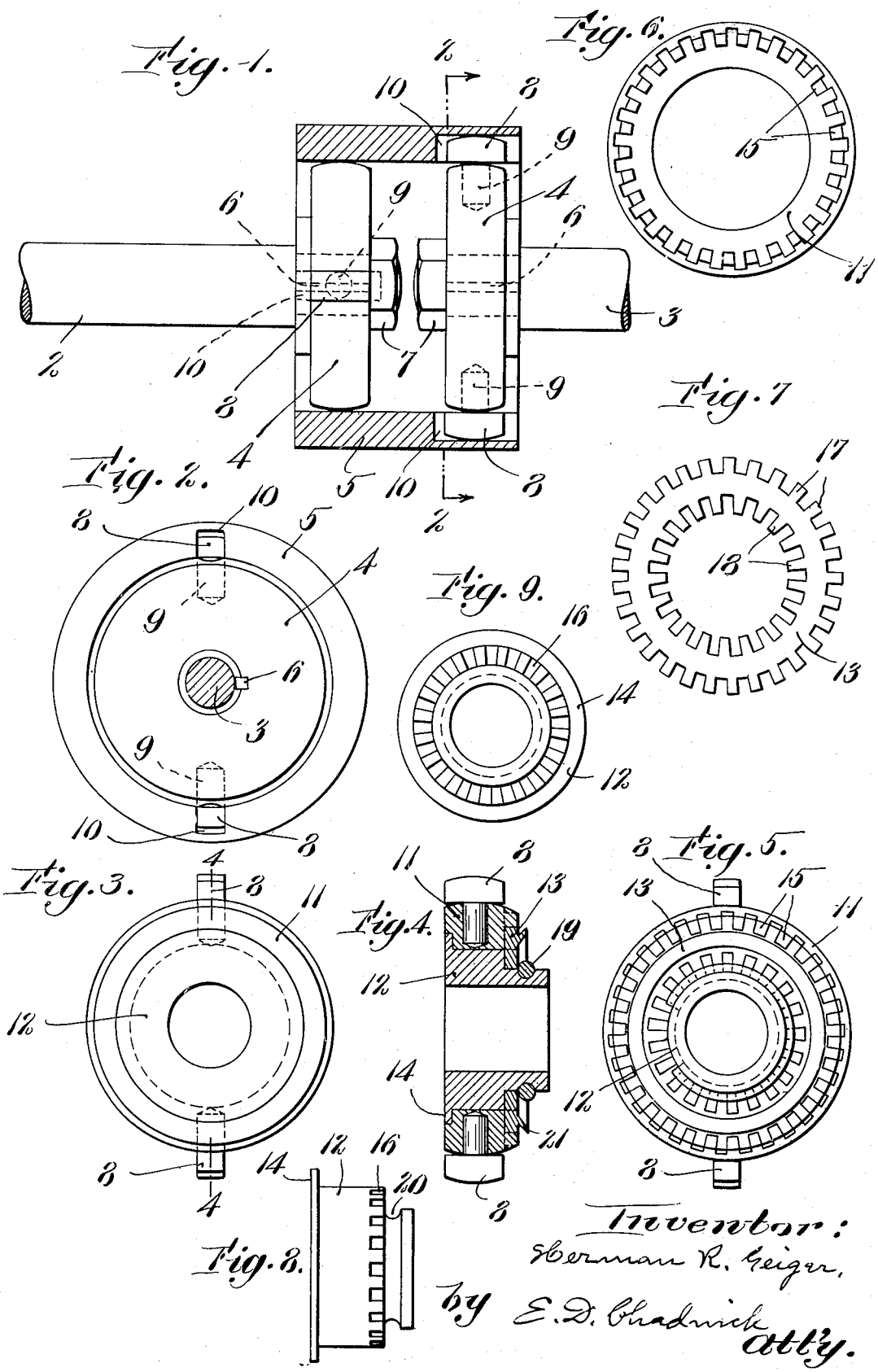

1,577,575

UNITED STATES PATENT OFFICE.

HERMAN R. GEIGER, OF BRONXVILLE, NEW YORK.

SHAFT COUPLING.

Application filed January 16, 1923. Serial No. 612,893.

*To all whom it may concern:*

Be it known that I, HERMAN R. GEIGER, a citizen of the United States, residing at Bronxville, in the county of Westchester and State of New York, have invented certain new and useful Improvements in Shaft Couplings, of which the following is a specification.

My invention relates to flexible couplings for connecting two shafts or sections of shafting which are liable to be slightly out of alignment, and is particularly intended to provide a simple and effective coupling for connecting the magneto shaft in an automobile to the power shaft that drives it. When so used it is desirable to include in the coupling such provisions for adjustment of the angular relation of the two shafts as will enable the magneto shaft to be properly timed with respect to the motor, and one of the features of my invention relates to adjusting means for this purpose, but the coupling can be constructed without adjusting means, if not needed, without otherwise affecting its utility.

In the accompanying drawing illustrating my invention,

Figure 1 is in part a side elevation and in part a central longitudinal section illustrating a form of my coupling without means for angular adjustment, applied to the adjacent ends of two shafts;

Figure 2 is a transverse section on the line 2—2 in Figure 1;

Figure 3 is an elevation showing one face of one of the members of a form of my coupling in which means for angular adjustment are included;

Figure 4 is a section on the line 4—4 in Figure 3;

Figure 5 is an elevation showing the opposite face of the coupling member illustrated in Figures 3 and 4;

Figure 6 is a similar view showing the outer portion of the same coupling member, detached;

Figure 7 is a similar view of a locking ring hereinafter described;

Figure 8 is a side elevation of the inner portion of the coupling member illustrated in Figures 3, 4 and 5; and Figure 9 is an elevation showing one face of the part illustrated in Figure 8.

Referring first to Figures 1 and 2 of the drawings, 2 and 3 indicate the adjacent end portions of two shafts to be coupled together, to each of which is rigidly secured a coupling member preferably having the form of a disk 4, and 5 indicates a third coupling member in the form of a cylindrical shell with open ends in which the disks 4 are received. In the construction illustrated the disks 4 are secured to the corresponding shafts by means of keys 6 (shown in dotted lines) and clamping nuts 7 screwed on to the threaded ends of the respective shafts, and are of such size as to fit easily within the shell 5, the periphery of each disk having a transverse curvature of which the center lies in the axis of the corresponding shaft. Each of said disks is provided at its periphery with one or more projections consisting, in the form shown, of a flat-sided bar 8 carried by a pin 9 extending radially into the disk and adapted to turn therein, and the shell 5 is provided internally, adjacent to its ends, with longitudinal grooves 10, each adapted to receive one of the bars 8 and make a sliding fit therewith. Preferably there are two projections on each disk, located at opposite ends of a diameter, and the two corresponding pairs of grooves 10 in the shell 5 are located at the ends of two diameters which are at right angles to each other. It will be seen that the shell 5 can tilt with respect to either disk on the axis of the pins 9 carried by that disk, and it can also tilt on an axis at right angles to that of the pins 9 by virtue of the capacity of the corresponding bars 8 to slide in their grooves 10, so that the shell is able to tilt in any direction with respect to either disk.

When the coupling above described is in use the rotation of either of the shafts causes the shell 5 to rotate by reason of its engagement with the projections on the corresponding disk 4 and the rotation of the shell is in like manner transmitted to the other disk 4 and through it to the shaft which carries it, and since the shell floats on the two disks and can tilt in any direction with respect to either of them the coupling is capable of accommodating itself to any slight mis-alignment of the axes of the two shafts, whether such mis-alignment resides in an angular displacement or in a lateral displacement of one shaft with respect to the other, or in both. Endwise movements of the shell on the disks are limited by the inner ends of the grooves 10, acting as stops for the bars 8.

In Figures 3 to 8 inclusive is shown my preferred arrangement for enabling the angular relation of the two shafts to be adjusted with respect to each other. In this case one of the members 4 above described is replaced by a member composed of several parts shown in assembled relation in Figures 3, 4 and 5 and including an outer ring 11, shown also in face view in Figure 6, a hub 12 shown in side elevation in Figure 8 and a locking ring 13 shown in face view in Figure 7. The outer ring 11 is shaped at its periphery like the disks 4 and carries the pivoted bars 8 already described, or equivalent projections adapted to enter and slide in the corresponding grooves in the shell 5, and the hub 12, on which the ring 11 fits, constitutes the inner portion of the coupling member and is adapted to be secured in any suitable manner to one of the shafts to be connected, said hub being preferably provided at one end with a flange 14 adapted to fit in a corresponding recess in the ring 11 and serve as a positioning stop. On their faces which are opposite the flange 14 the ring 11 and hub 12 are provided respectively with radial teeth 15 and 16 arranged in concentric circular series, and between the two series of teeth is left a space adapted to receive the locking ring 13, which is provided externally and internally with teeth 17 and 18 adapted to fit the spaces between the teeth 15 and 16 on the ring 11 and hub 12 respectively. It will be evident that when the parts are in assembled relation, with the ring 13 located between the two series of teeth 15 and 16, the ring 11 and the hub 12 will be locked together, but if the ring 13 is disengaged from the teeth 15 and 16 either the ring 11 or the hub 12 can be turned circumferentially with respect to the other, thus providing for any desired adjustment of the angular relation of the shaft which carries the hub 12 to the other shaft to which the coupling is applied. After the desired angular adjustment has been effected the ring 13 is restored to its locking position and is there held by suitable means, such for example as a split ring 19 sprung into a groove 20 formed in the hub 12 adjacent to the teeth 16.

In the assembled coupling the parts 11, 12 and 13 are exposed at one end of the shell 5, and in order to facilitate the disengagement of the locking ring 13 from the teeth on the parts 11 and 12 said ring is preferably provided on its outer face with an annular under cut flange 21 which can be engaged by the fingers or by a suitable tool for the purpose of pulling the ring 13 outwardly after the split ring 19 has been removed. Since the ring 13 can be made quite thin only a slight movement is necessary to disengage it, and preferably the hub 12 is made long enough to pass through and support the ring when disengaged, thus enabling the relative adjustment of the parts 11 and 12 to be changed without disconnecting the couplings from the shaft to which the hub 12 is secured. When the coupling is used for connecting the shaft of a magneto to a power shaft the hub 12 is preferably secured to the power shaft, and after the locking ring 13 has been disconnected the magneto shaft can be adjusted by turning the ring 11 on the hub 12. After the desired adjustment has been obtained the parts 11 and 12 can be locked together by rotating the ring 13, at the same time pressing it inward and turning the hub 12 slightly if necessary, until the ring reaches a position in which its outer and inner teeth enter the spaces between the teeth 15 and 16 respectively, and in order to enable this to be done without materially changing the adjustment obtained it is desirable to employ a considerable number of relatively small teeth on the ring 11 and the hub 12 and to have the numbers of the teeth in the two series incommensurable or substantially so, that is, without any large common divisor. In the coupling illustrated there are 29 teeth on the outer ring 11 and 21 teeth on the hub 12, enabling adjustments within one degree of angle to be obtained.

The coupling above described has the advantages that it is not only simple, durable and inexpensive but is also positive in action, since there is no opportunity for lost motion between any of the parts, and it will be evident that its details may be considerably varied without losing these advantages or departing from my invention. For example, the projections and grooves may be constructed and arranged in various ways so long as they provide for relative longitudinal movements between the parts which they connect, as well as for relative turning movements on axes radial to the two shafts, and when the coupling members 4 have the form of disks a single projection at each end of the shell will render the coupling operative, since the disks will support the shell in any position, but it is not essential to construct said members in the form of disks if the number and arrangement of the projections employed is such as to afford support for the intermediate coupling member in all positions. A coupling member having the described means for adjustment may also be used to advantage in flexible shaft couplings of various types, in case it is desired to provide for angular adjustment of the driving and driven shafts without disconnecting either of them from the coupling.

I claim:

1. In a shaft coupling, a coupling member comprising a hub adapted to be secured to one of the shafts to be connected, a ring rotatably mounted on the hub, said hub and ring being provided on corresponding faces with teeth arranged in concentric circular series, a locking ring adapted to engage both series of teeth simultaneously and exposed for manipulation at one end of the coupling, said hub being extended through the latter ring and adapted to support it when out of engagement with the teeth, and means for removably securing said ring in locking position.

2. In a shaft coupling, a coupling member comprising a hub adapted to be secured to one of the shafts to be connected, a ring rotatably mounted on the hub, said hub and ring being provided on corresponding faces with teeth arranged in concentric circular series, a locking ring adapted to engage both series of teeth simultaneously, said hub being extended through the latter ring and adapted to support it when out of engagement with the teeth, and a split ring adapted to be removably sprung into a groove in the hub, adjacent to the locking ring, for securing the latter ring in locking position.

3. In a shaft coupling, a coupling member comprising a hub adapted to be secured to one of the shafts to be connected, a ring rotatably mounted on the hub, said ring and hub being provided on corresponding faces with circular series of teeth, arranged concentrically and substantially incommensurable numerically, a locking ring provided externally and internally with similar series of teeth adapted to enter simultaneously between the teeth on the ring and hub, and means for removably securing the locking ring in operative position.

4. A shaft coupling comprising a coupling member adapted to be secured to one of the shafts to be connected, another coupling member including a hub adapted to be secured to the other shaft to be connected and a ring rotatably mounted on the hub, projections carried by said ring and by the peripheral portion of the other coupling member, a shell having open ends in which said coupling members are located and provided internally with longitudinal grooves, each of said projections being located in one of the grooves and providing for relative movements of the shell longitudinally with respect to its own axis and pivotally with respect to axes radial to the two shafts, and means located on the outer faces of the ring and hub and accessible at the adjacent open end of the shell for adjustably securing said ring and hub together.

5. A shaft coupling comprising a coupling member adapted to be secured to one of the shafts to be connected, another coupling member including a hub adapted to be secured to the other shaft to be connected and a ring rotatably mounted on the hub, projections carried by said ring and by the peripheral portion of the other coupling member, a shell having open ends in which said coupling members are located and provided internally with longitudinal grooves, each of said projections being located in one of the grooves and providing for relative movements of the shell longitudinally with respect to its own axis and pivotally with respect to axes radial to the two shafts, and means for adjustably securing the ring and hub together including concentric circular series of teeth located on the outer faces of said ring and hub, a locking ring adapted to engage both series of teeth simultaneously, and means for removably securing the latter ring in locking position.

Signed at New York, N. Y., this eleventh day of January, 1923.

HERMAN R. GEIGER.